United States Patent Office 3,264,360
Patented August 2, 1966

3,264,360
PREPARATION OF ORGANOMAGNESIUM COMPOUNDS
Walter Nudenberg, West Caldwell, William J. Heintzelman, Basking Ridge, and Vincent A. Rolleri, Parsippany, N.J., assignors to Texas-U.S. Chemical Company, Parsippany, N.J., a corporation of Delaware
No Drawing. Filed Jan. 31, 1963, Ser. No. 255,196
17 Claims. (Cl. 260—665)

The present invention relates to a process for preparing organomagnesium compounds.

The classical methods for preparing organomagnesium compounds of the type known as Grignard reagents utilizes ethers or certain other oxygenated compounds as the solvent. The organomagnesium compounds prepared are solvated with the oxygenated compounds. It is difficult and often impossible to free the organomagnesium compound from the oxygenated solvent. Oxygen-free organomagnesium compounds are desired for use as polymerization catalysts. In particular, the oxygen-free organomagnesium compounds are desired for use as catalysts in controlled structure polymerizations.

It is the object of this invention to provide a novel process for preparing organomagnesium compounds. It is another object of this invention to provide novel solutions containing diorganomagnesium compounds.

We discovered that non-oxygenated organomagnesium compounds are prepared by reacting a hydrocarbon halide with magnesium in a chloroaryl solvent. The process is carried out by reacting clean magnesium in subdivided form with a relatively small amount of the chloroaryl until the reaction of the halide and magnesium commences. The desired hydrocarbon halide in the chloroaryl solvent is then added at a rate to maintain the reaction. We discovered that with the proper selection of solvent the magnesium compound of the desired hydrocarbon halide reactant is prepared to the exclusion of the solvent.

The hydrocarbon halides, that are utilized by our novel process are those that are more reactive with magnesium, under the process conditions, than is the solvent. These more reactive halides are generally the hydrocarbon bromides and iodides. The alkyl chlorides and the other more highly reactive chlorides, are also more reactive than the chloroaryl solvent. Those hydrocarbon halides that are sufficiently reactive with magnesium so that they will react, largely or completely to the exclusion of reaction of the chloroaryl solvent with the magnesium, are termed "active hydrocarbon halides" herein.

The active hydrocarbon halides, designated RX, are generally those in which R is an aliphatic group, a cycloaliphatic group, or an aromatic group. The groups of most interest and, therefore, preferred are alkyls having 1 to 12 carbon atoms, cyclohexyl and cyclopentyl, and mono- and bicyclic aryls. The various R groups may contain substituents thereon which are not reactive with magnesium, with the solvent, or with the organomagnesium compound formed, under the process conditions. These substituting groups include hydrocarbon groups such as phenyl, e.g. phenyl on methyl resulting in a benzyl group, lower alkyls, halides, etc. The term "active hydrocarbon halides" includes such substituted hydrocarbons. Preferred organomagnesium compounds prepared from the active hydrocarbon halides are those noted in the examples and the following list: Dodecylmagnesium iodide, dodecylmagnesium bromide, decylmagnesium iodide, stearlymagnesium iodide, methylmagnesium iodide, ethylmagnesium bromide, ethylmagnesium chloride, methylmagnesium chloride, ethylmagnesium iodide, myristylmagnesium bromide, nonlymagnesium iodide, nonylmagnesium chloride, naphthylmagnesium bromide, phenylmagnesium bromide, hexlymagnesium iodide, 2-ethylhexylmagnesium bromide, butylmagnesium bromide and chloride, octylmagnesium iodide, cyclohexylmagnesium iodide, p-tertiary butyl phenyl magnesium iodide, benzylmagnesium iodide, hexadecylmagnesium chloride, propargylmagnesium bromide and cetylmagnesium iodide; and didodecylmagnesium, didecylmagnesium, distearylmagnesium, dimethylmagnesium, diethylmagnesium, dimyristylmagnesium, dinonlymagnesium, dinaphthylmagnesium, diphenylmagnesium, dihexylmagnesium, di-p-tolylmagnesium, di-2-ethylhexylmagnesium, dioctylmagnesium, dicyclohexylmagnesium, di-p-tert-butylmagnesium, dibenzylmagnesium, dihexadecylmagnesium, dipropargylmagnesium, dicetylmagnesium and dibutylmagnesium.

The preferred solvents are chlorine-containing aromatics and preferably include chlorobenzene, chlorotoluene, chloroxylene, and chloronaphthalene. Because of availability and desirable properties the mono- and dichlorobenzene is presently preferred as the solvent. To determine a suitable solvent to prepare the Grignard of a given active hydrocarbon halide, the relative reactivity with magnesium under the process conditions governs. For closely related halides it is often necessary to experimentally determine whether a given hydrocarbon halide is an active hydrocarbon halide, or solvent. This is exemplified by the finding that p-tolyl chloride is an active hydrocarbon halide when utilizing chlorobenzene as the solvent, whereas o-tolyl chloride is inactive under the same conditions. The test is a simple one in which a small scale run is prepared. Small glassware apparatus is suitable.

It is often considered that Grignards in ether solution are in the form of an equilibrium between compounds having the formula $R_2Mg$ and $RMgX$, as shown in the following equation:

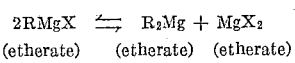

$$2RMgX \rightleftharpoons R_2Mg + MgX_2$$
(etherate)   (etherate)   (etherate)

The relative amounts of the diorganomagnesium compound and the organomagnesium halide is dependent upon many factors. In our process, we find that this can be controlled by the amount of chloroaryl solvent relative to the amount of the active hydrocarbon halide. At high levels of chloroaryl solvent, greater than 92% of the organomagnesium compound formed is the diorganomagnesium, $R_2Mg$; with relatively lower levels of solvent the product is largely the halide, $RMgX$.

The temperature at which the reaction is carried out is dependent upon the particular solvent and reactants utilized. It is an advantage of our process that utilizing the chloroaryls, and particularly chlorobenzene, the reaction may be carried out at temperatures below 130° C. Preferred temperatures are between 25° C. and 125° C. The temperatures may be controlled by refrigeration and/or rate of addition of the active hydrocarbon halide and/or relative amount of the active hydrocarbon halide and solvent. The most desirable temperatures between ambient temperatures and the reflux temperature of the system are usually determined by relatively simple experiments at different temperatures. As is generally known in preparation of Grignards, oxygen and air react with Grignards and should largely be excluded from the reaction chamber. The process is preferably carrried out in an inert atmosphere. Nitrogen is suitable and preferred because it is the least expensive. Other inert gases such as argon are also suitable. Atmospheric pressures are suitable.

The magnesium, in subdivided form, should be clean, i.e. oxide free and moisture free. It is preferably freshly prepared and used or stored under an inert atmosphere until used.

The reaction is generally carried out by inserting, in a reaction chamber having a nitrogen atmosphere, clean magnesium and adding a relatively small amount of the chloroaryl solvent and warming until the reaction of the solvent with magnesium commences. The magnesium may be activated by utilizing the "heel" of a prior reaction. When the reaction commences, a solution of the active halide hydrocarbon, RX, in the solvent is added at a rate sufficient to maintain the reaction and not so large that it will "smother" the reaction. The rate of addition depends on such factors as the activity of the hydrocarbon halide, or the particular solvent selected, the amount of solvent, the size and type of the reaction chamber, etc. Agitation of the reaction mixture is usually carried out during addition and/or subsequent to the completion of the addition.

The organomagnesium compounds prepared by this process are thermally stable. This is illustrated by the ability to separate them. The chloroaryl solvent solution and/or dispersions can be heated to dryness in vacuum or at atmospheric pressure (with an inert gas). Subsequently, they can be treated with hydrocarbon solvents to yield solutions and/or dispersions in these hydrocarbon solvents. The chloroaryl solvent-soluble organomagnesium compounds, $R_2Mg$, dissolve in hydrocarbon solvents. The organomagnesium halides, RMgX, are easily dispersed in hydrocarbon solvents. The chloroaryl solvents yield dispersions and/or solutions of the organomagnesium compounds which are fluid (low viscosity) and therefore easily pumped. The dispersions (suspensions) in the chloroaryl solvents are generally more stable than the same suspensions in hydrocarbon solvents. These properties result in the ability to separate the organomagnesium compounds from the solvent and to prepare them in an available and desired form, as is more particularly pointed out in the examples.

The process may be better understood by reference to the following specific examples which outline the details of the process.

The following general procedure was used in all the examples. Clean magnesium was prepared by heating ribbon to remove surface moisture and then grinding in a Waring Blendor under argon or nitrogen to expose fresh surfaces. A three-neck flask was flushed with the inert gas and provided with a stirrer, a pressure compensating dropping funnel, a reflux condenser and provisions for flushing with the inert gas, usually nitrogen. The clean magnesium was inserted in the flask. The inert gas purge was continued and a small amount of anhydrous chloroaryl solvent was added. The flask was heated until reaction began and then the active hydrocarbon halide dissolved in chloroaryl solvent was added by means of a dropping funnel and stirring initiated.

*Example I*

To freshly fractured magnesium (12 gms., ½ mole), contained in a flask, was added 5 mls. of chlorobenzene and the temperature raised to 80° C. On the appearance of a yellow color agitation was started, and a 10 mole percent solution of 1-bromobutane in chlorobenzene (one tenth of a mole of bromobutane) was added at such a rate as to maintain the temperature at 80° C. The reaction appeared complete within three hours. Titration of a sample of the reaction mixture with excess acid indicated a yield of 71% of organomagnesium compound calculated on the butyl bromide. Carbonation of an aliquot of the reaction mixture resulted in the formation of a high yield of pentanoic acid. No benzoic acid appeared, demonstrating that the bromobutane reacted preferentially with the magnesium to form the butylmagnesium compounds.

*Example II*

To a three-necked flask was added fractured magnesium (0.5 gram-atom). Addition of 5 ml. of chlorobenzene followed by heating to 90° C., caused the appearance of a yellow color. A 10 mole percent solution of alpha-bromonaphthalene (one-tenth mole in 0.9 mole of chlorobenzene) was added dropwise to the magnesium with stirring over a period of three hours. Heating was continued an additional 2 to 3 hours. Titration with excess acid and also carbonation of aliquots of the mixture showed the formation of a 95% yield of naphthylmagnesium bromide and/or di-naphthylmagnesium. Only 1-naphthoic acid was isolated from the carbonation reaction showing preferential reaction of the magnesium with a bromonaphthalene.

*Example III*

This example illustrates the comparative ease with which the aromatic organomagnesium iodides which are normally difficult to prepare in good yields can be produced by the method of this disclosure. Freshly fractured magnesium (0.5 mole) contained in a three-necked flask, blanketed with inert gas, was heated with 5 ml. of chlorobenzene at 125° C. for 30 minutes until the appearance of a yellow color. A 10 mole percent solution of 1-iodonaphthalene in chlorobenzene was prepared by dissolving 0.1 mole of 1-iodonaphthalene in 0.9 mole of chlorobenzene. Twenty-one ml. of this solution was added to the magnesium. The temperature (oil bath) was gradually raised to 135° C. Two hours were taken for this gradual temperature increase. The remainder of the solution was now added dropwise over the course of the next half-hour. Stirring was now begun and the temperature was maintained at 120° C. for four additional hours. Two hundred milliliters of additional chlorobenzene was added at the end of this time. An 87% yield of 1-naphthylmagnesium iodide was obtained.

*Example IV*

Freshly fractured magnesium, 6 g. (0.25 mole) in an inert atmosphere (nitrogen) was heated with 2 ml. of chlorobenzene at 90–125° C. for 15 minutes until the appearance of yellow color. A solution of 25 g. (0.54 mole) ethyl chloride in 75 ml. of chlorobenzene was added dropwise to the "activated" magnesium, contained in a flask provided with Dry Ice condenser, over a period of five hours maintaining the reaction flask temperature between 46° to 50° C. (oil bath 120° C.) Cloudiness began to develop in the stirred mixture after five hours. Stirring was continued for three additional hours at oil bath temperature of 120° C. reaction temperature 46° C.) Hydrolysis of the slurry liberated a colorless gas, ethane=0.56 milliequivalent/milliliter. No alkylation was observed.

*Example V*

Freshly fractured magnesium, 12 g. (0.5 g. atom) in an inert atmosphere (nitrogen) was heated with 2 ml. of chlorobenzene at about 90° C. for 15 minutes until appearance of yellow color. Agitation was started and a 5 mole percent solution of bromobutane in chlorobenzene (one-twentieth mole in 1 mole of chlorobenzene) was added dropwise to the magnesium. Temperature was maintained for about three hours. Excess chlorobenzene was added and the reaction mixture cooled and filtered to remove solid material, including that dispersed or suspended in the solvent. We had earlier observed that the dialkyl-, and diarylmagnesium compounds of our invention are soluble in haloaryl solvents, while the organomagnesium halides are not. The filtered chlorobenzene solution which contained the dissolved dibutylmagnesium was then slowly heated to dryness in vacuum, and the dry residue of dibutylmagnesium was then dissolved in benzene.

*Examples VI–XIV*

The same general procedure was utilized in these experiments. 4.9 g. of clean magnesium was used. The active hydrocarbon halide was dissolved in two hundred milliliters of chlorobenzene in all the examples except Example XIV in which the butyl iodide was dissolved in two hundred milliliters of o-dichlorobenzene. The pertinent data for these examples is given in the following table:

| Example No. | RX | Temperature, °C. | Reaction Time, hrs. |
| --- | --- | --- | --- |
| VI | n-C₄H₉Br | 100 | 3 |
| VII | n-C₁₀H₂₁Br | 120 | 4 |
| VIII | p-CH₃C₆H₄Br | reflux | 2 |
| IX | n-C₄H₉I | 65 | 3 |
| X | m-CH₃C₆H₄Br | reflux | 3 |
| XI | C₂H₅I | 100 | 3 |
| XII | α-C₁₀H₇Br | reflux | 4 |
| XIII | n-C₁₀H₂₁I | 105 | 4 |
| XIV | n-C₄H₉I | 85 | 3 |

Similar Grignards are prepared in the other chloroaryls such as chlorotoluene, chloroxylene, and chloronaphthalene. More highly substituted active hydrocarbon halides such as trifluoromethyl alkyl bromide, as well as secondary and tertiary alkyl bromides and iodides are reacted with magnesium to form the desired organomagnesium compounds. The reaction gives high yields in short reaction times, e.g. one, two or three hours.

The oxygen-free organomagnesium compounds prepared in accordance with our process are useful catalysts for controlled structure polymerizations. In particular they are used to catalyze diene polymerizations to yield polymers having predominantly cis configurations.

Although the invention has been specifically described herein, it is to be understood that variants thereof may be adopted without departing from its spirit or scope.

What is claimed is:

1. The process for preparing organomagnesium compounds consisting essentially of reacting in the absence of a solvate forming solvent and in an oxygen-free atmosphere, an active hydrocarbon halide dissolved in solvent selected from the class consisting of chlorinated mono- and bicyclic aryls, with magnesium; said active hydrocarbon halide being more reactive with magnesium than is said solvent.

2. The process for preparing organomagnesium compounds consisting essentially of contacting in the absence of a solvate forming solvent and in an inert atmosphere, a small amount of a solvent selected from the class consisting of chlorinated mono- and bicyclic aryls with clean magnesium until reaction commences and then slowly adding, at a rate sufficient to continue reaction at a temperature below the boiling point of said solvent, a solution of an active hydrocarbon halide in said solvent, to form the magnesium compound of said hydrocarbon halide; active hydrocarbon halide being more reactive with magnesium than is said solvent.

3. The process of claim 2 wherein the active hydrocarbon halide is a hydrocarbon bromide.

4. The process of claim 2 wherein the active hydrocarbon halide is a hydrocarbon iodide.

5. The process of claim 2 wherein the temperature is maintained between 25° C. and 125° C. during the process.

6. The process for preparing organomagnesium compounds consisting essentially of contacting in the absence of a solvate forming solvent and in an inert atmosphere, a small amount of a chlorobenzene with clean magnesium until reaction commences and then adding, at a rate sufficient to continue the reaction, a chlorobenzene solution of an active hydrocarbon halide selected from the class consisting of dodecyl iodide, dodecyl bromide, decyl iodide, stearyl iodide, methyl iodide, ethyl bromide, ethyl iodide, myristyl bromide, nonyl iodide, nonyl chloride, naphthyl bromide, phenyl bromide, hexyl iodide, 2-ethylhexyl bromide, butyl bromide and chloride, octyl iodide, p-tertiary butyl phenyl iodide, hexadecyl chloride, propargyl bromide and cetyl iodide.

7. The process of claim 6 wherein the active hydrocarbon halide is α-naphthyl bromide.

8. The process of claim 1 wherein said active hydrocarbon halide is selected from the class consisting of alkyls having 1 to 12 carbon atoms, cyclohexyl, cyclopentyl, and mono and bicyclic aryls.

9. The process for preparing organomagnesium compounds comprising contacting, in an inert atmosphere, a small amount of a solvent selected from the class consisting of chlorinated mono- and bicyclic aryls with clean magnesium until reaction commences and then slowly adding, at a rate sufficient to continue reaction at a temperature below the boiling point of said solvent, a solution of an active hydrocarbon halide in said solvent, wherein the halide is present in a large amount relative to said solvent, to form a product that is predominantly the hydrocarbonmagnesium halide; said active hydrocarbon halide being more reactive with magnesium than is said solvent.

10. The process for preparing organomagnesium compounds comprising contacting, in an inert atmosphere, a small amount of a solvent selected from the class consisting of chlorinated mono- and bicyclic aryls with clean magnesium until reaction commences and then slowly adding, at a rate sufficient to continue reaction at a temperature below the boiling point of said solvent, a solution of an active hydrocarbon halide in said solvent, wherein the solvent is present in a large amount relative to the halide, to form a product that is predominantly the dihydrocarbonmagnesium; said active hydrocarbon halide being more reactive with magnesium than is said solvent.

11. The process for preparing organomagnesium compounds comprising contacting, in an inert atmosphere, a small amount of a solvent selected from the class consisting of chlorinated mono- and bicyclic aryls with clean magnesium until reaction commences and then slowly adding, at a rate sufficient to continue reaction at a temperature below the boiling point of said solvent, a solution of an active hydrocarbon halide in said solvent, to form the dihydrocarbon magnesium and the hydrocarbonmagnesium halide of said hydrocarbon halide, and then separating the dihydrocarbonmagnesium compound from said chloroaryl solvent, and then dissolving said compound in a hydrocarbon slovent.

12. The process of claim 11 wherein the hydrocarbon solvent is benzene.

13. The process for preparing organomagnesium compounds comprising contacting in an inert atmosphere, a small amount of a chlorobenzene wih clean magnesium until reaction commences and then adding, at a rate sufficient to continue the reaction, a solution of dodecyl bromide in chlorobenzene.

14. The process for preparing organomagnesium compounds comprising contacting in an inert atmosphere, a small amount of a chlorobenzene with clean magnesium until reaction commences and then adding, at a rate sufficient to continue the reaction, a solution of butyl bromide in chlorobenzene.

15. The process for preparing organomagnesium compounds comprising contacting in an inert atmosphere, a small amount of a chlorobenzene with clean magnesium until reaction commences and then adding, at a rate sufficient to continue the reaction, a solution of decyl bromide in chlorobenzene.

16. The process for preparing organomagnesium compounds comprising contacting in an inert atmosphere, a small amount of a chlorobenzene with clean magnesium until reaction commences and then adding, at a rate sufficient to continue the reaction, a solution of lauryl bromide in chlorobenzene.

17. The process for preparing organomagnesium compounds comprising contacting in an inert atmosphere, a small amount of a chlorobenzene with clean magnesium until reaction commences and then adding, at a rate sufficient to continue the reaction, a solution of dodecyl iodide in chlorobenzene.

References Cited by the Examiner

UNITED STATES PATENTS 2,056,822 10/1936 Britton et al. _____ 260—665
3,095,460 6/1963 Olah _____ 260—665

FOREIGN PATENTS 3,221 1955 Japan.

OTHER REFERENCES

Bryce-Smith et al.: J. Chem. Soc. (London), 1961, pages 1175–1182.

Chem. Ab., vol. 51, 1957, page 16534.

TOBIAS E. LEVOW, *Primary Examiner.*

E. C. BARTLETT, T. L. IAPALUCCI,
*Assistant Examiners.*